(12) United States Patent
Song

(10) Patent No.: US 7,331,054 B2
(45) Date of Patent: Feb. 12, 2008

(54) VIBRATION DAMPING MEANS FOR OPTICAL RECORDING/REPRODUCING APPARATUS

(75) Inventor: Shu-Min Song, Shenzhen (CN)

(73) Assignees: Hong Fu Jin Precision Industry (Shenzhen) Co., Ltd., Shenzhen, Guangdong Province (CN); Hon Hai Precision Industry Co., Ltd., Tu-Cheng, Taipei Hsien (TW)

( * ) Notice: Subject to any disclaimer, the term of this patent is extended or adjusted under 35 U.S.C. 154(b) by 394 days.

(21) Appl. No.: 10/952,685

(22) Filed: Sep. 29, 2004

(65) Prior Publication Data

US 2005/0207321 A1     Sep. 22, 2005

(30) Foreign Application Priority Data

Mar. 19, 2004   (CN)   .................. 2004 2 0043937 U

(51) Int. Cl.
*G11B 33/08*    (2006.01)
(52) U.S. Cl. ..................................................... 720/692
(58) Field of Classification Search ................ 720/692, 720/693, 694; 369/75.11, 75.21
See application file for complete search history.

(56) References Cited

U.S. PATENT DOCUMENTS

| | | | |
|---|---|---|---|
| 4,005,858 A * | 2/1977 | Lochner | 267/136 |
| 5,668,791 A | 9/1997 | Yamada et al. | 369/247 |
| 5,915,662 A * | 6/1999 | Itakura et al. | 248/561 |
| 6,292,455 B1 * | 9/2001 | Saruwatari et al. | 720/692 |
| 6,324,153 B2 * | 11/2001 | Furukawa et al. | 720/694 |
| 6,349,084 B1 * | 2/2002 | Ariyoshi | 720/692 |
| 6,603,728 B1 * | 8/2003 | Hopf et al. | 720/651 |
| 6,683,840 B2 | 1/2004 | Shin | 369/247 |
| 6,934,961 B2 * | 8/2005 | Itakura | 720/692 |
| 7,023,657 B2 * | 4/2006 | Sohn et al. | 360/99.08 |

* cited by examiner

*Primary Examiner*—Angel Castro
(74) *Attorney, Agent, or Firm*—Morris Manning Martin LLP; Tim Tingkang Xia, Esq.

(57) ABSTRACT

A vibration damping means (30) for an optical reproducing/recording apparatus (100) includes a first damper (4), and a second damper (5) received in the first damper. The first damper has a damp coefficient adapted to absorb vibrations generated due to the spindle motor rotating. The first damper includes first and second engaging portions (41, 42) at opposite ends thereof, and a deformable portion (43) between the first and second engaging portions. A flange (45) extends from an interior surface of the deformable portion. The second damper defines a groove (52) engagingly receiving the flange of the first damper. If the apparatus sustains an impact or shock, the first and second dampers are deformed together. The overall damp coefficient of each damping means equals the sum of the damp coefficients of the first and second dampers. This larger damp coefficient enables the damping means to satisfactorily absorb the large intensity vibration.

16 Claims, 3 Drawing Sheets

VIBRATION DAMPING MEANS FOR OPTICAL RECORDING/REPRODUCING APPARATUS

BACKGROUND OF THE INVENTION

1. Field of the Invention

The present invention generally relates to optical recording and/or reproducing apparatuses such as those used in computers, CD players and DVD players, and particularly to a vibration damping means for an optical recording and/or reproducing apparatus which dampens vibrations among components thereof.

2. Description of Prior Art

Optical disks are in widespread use as recording media for storage of information such as images, sound, text data, etc. An apparatus which records and/or reproduces information onto or from such optical disks usually has a main body with a chassis. A spindle motor and an optical pickup unit are mounted on the chassis. When the spindle motor rotates the optical disk, the optical pickup unit emits a laser beam vertically illuminating a desired recording track formed on the optical disk. The recording tracks on the optical disk are arranged highly compactly. If the optical pickup unit is disturbed from its original precise position relative to the optical disk, the laser beam cannot follow and illuminate the correct recording track, and the apparatus cannot successfully record or reproduce information.

With the rapid improvement in recording and/or reproducing speeds, vibration is becoming an increasingly serious problem. When the spindle motor rotates at high speed, vibrations are frequently generated because of imbalance of the optical disk. These vibrations are transmitted to the optical pickup unit by the chassis, and cause the optical pickup unit to deviate from position. Vibration may also originate from the external environment. For example, the apparatus may be bumped or accidentally fall to the ground. The vibrations are transmitted to the optical pickup unit via other components of the apparatus. Furthermore, the intensity of these vibrations is generally large, and the optical pickup unit is often seriously damaged.

Conventionally, there are two kinds of means used to prevent vibration from affecting the optical pickup head. In the first means, a heavy chassis is used for supporting of the spindle motor. One major drawback of this means is that it makes the apparatus weighty and costly. Another major drawback is that it cannot effectively protect the optical pickup head from vibration originating from the external environment. In the second means, a vibration damping member is installed between the chassis and a frame which supports the chassis. The vibration damping member is usually a rubber gasket. However, this means also has drawbacks. Normally, the capacity of the vibration damping member to absorb vibration is determined by its damp coefficient. In the case where the vibration damping member has a small damp coefficient, it substantially absorbs only vibrations with small intensity and high frequency, such as vibrations produced when the spindle motor rotates. In the case where the vibration damping member has a large damp coefficient, it substantially absorbs a limited scope of vibrations with large intensity such as those produced by external impact. However, because the damp coefficient of the vibration damping member is constant, it is difficult to achieve a damp coefficient which enables the vibration damping member to satisfactorily absorb the diverse vibrations that the apparatus is generally subjected to.

SUMMARY OF THE INVENTION

Accordingly, an object of the present invention is to provide a vibration damping means for an optical recording and/or reproducing apparatus, the vibration damping means having different damp coefficients to effectively absorb different kinds of vibrations.

To achieve the above object, a vibration damping means for an optical reproducing/recording apparatus includes a first damper and a second damper received in the first damper. The first damper has a damp coefficient adapted to absorb vibrations generated due to the spindle motor rotating. The first damper includes first and second engaging portions located at opposite ends thereof, and a deformable portion located between the first and second engaging portions. A flange extends from an interior surface of the deformable portion. The second damper defines a groove engagingly receiving the flange of the first damper. In the case where the apparatus sustains an impact or shock, the vibration produced has a large intensity, and the first and second dampers are deformed together. In these circumstances, the damp coefficient of each vibration damping means equals the sum of the damp coefficients of the first and second dampers. This larger overall damp coefficient enables the vibration damping means to satisfactorily absorb the vibration.

BRIEF DESCRIPTION OF THE DRAWINGS

Other objects, advantages and novel features of the present invention will be drawn from the following detailed description of a preferred embodiment of the present invention with attached drawings, in which.

DETAILED DESCRIPTION OF PREFERRED EMBODIMENT

Figure 1:
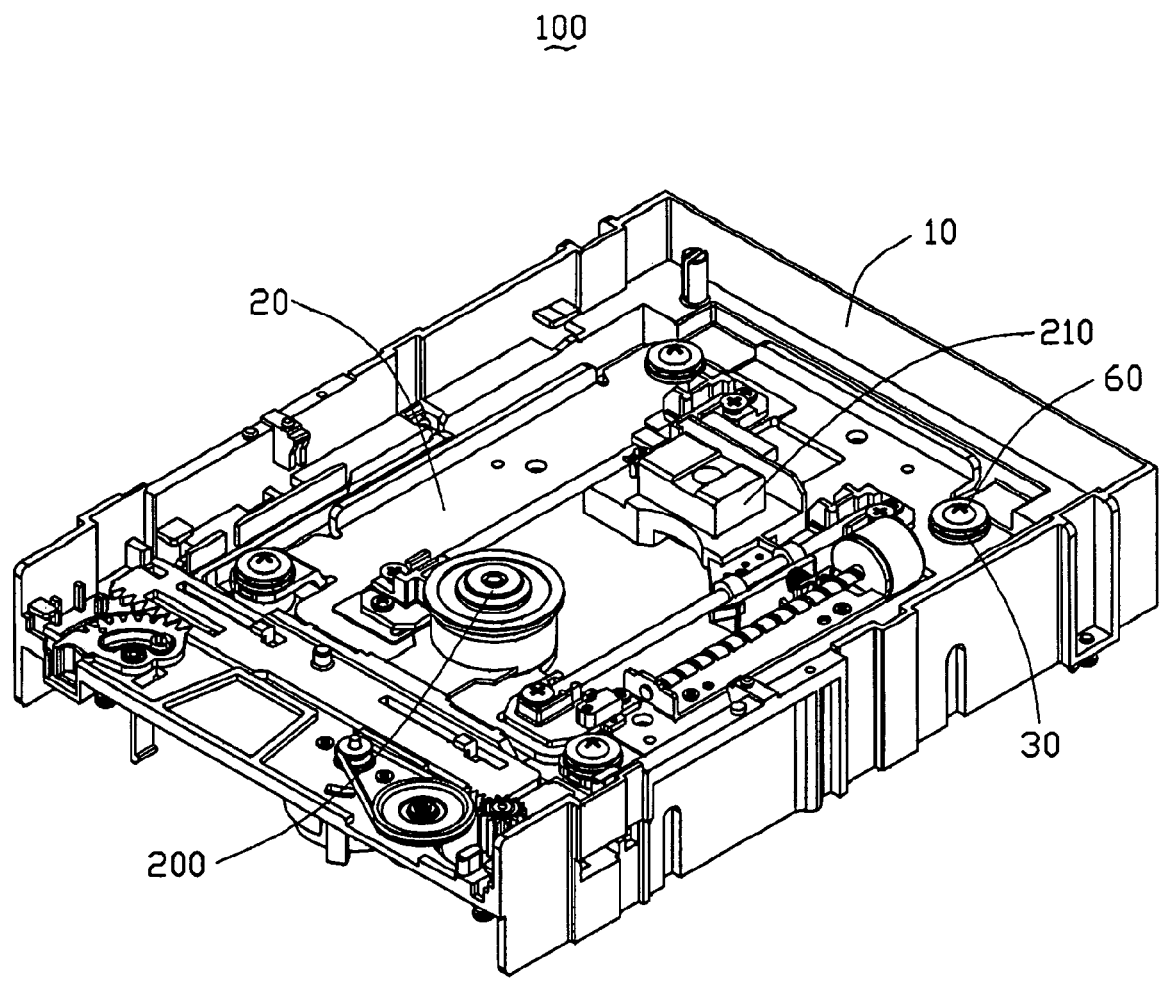
FIG. 1 is an isometric view of an optical reproducing/recording apparatus having damper units in accordance with the present invention.

Referring to FIG. 1, an optical recording and/or reproducing apparatus 100 having a vibration damping means according to the present invention includes a rectangular frame 10, and a base member 20 supported on the frame 10 via four damper units 30. A mounting portion (not shown) is formed at each corner of the frame 10, and a screw hole is defined in a center of each mounting portion. The base member 20 is formed of metal, and is substantially a planar plate. Four cutouts (not labeled) are defined in corners of the base member 20, corresponding to the mounting portions of the frame 10. A spindle motor 200 is installed on an upper surface of the base member 20, with a driving shaft of the spindle motor 200 pointing upward in order to support and rotate an optical disk. An optical pickup unit 210 as one of vibration-sensitive components is mounted on the base member 20, to transmit laser beams onto the optical disk and receive reflected laser beams returned from the optical disk.

Figure 2:
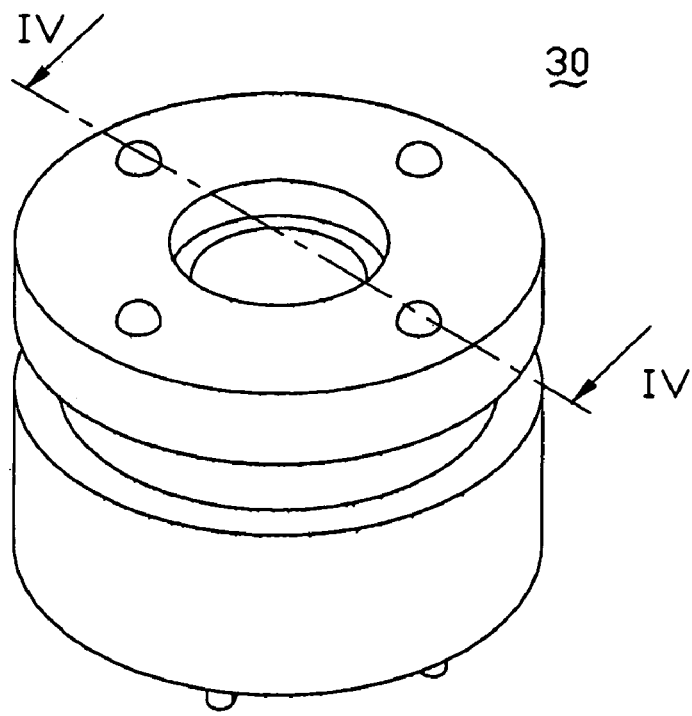
FIG. 2 is an enlarged, isometric view of one of the damper units of FIG. 1.
Figure 3:
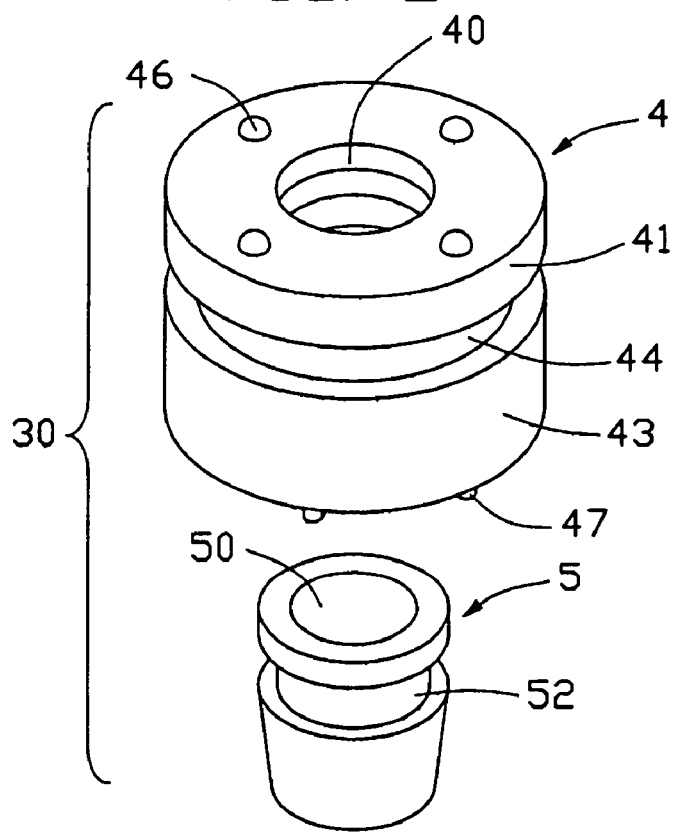
FIG. 3 is an exploded view of FIG. 2.
Figure 4:
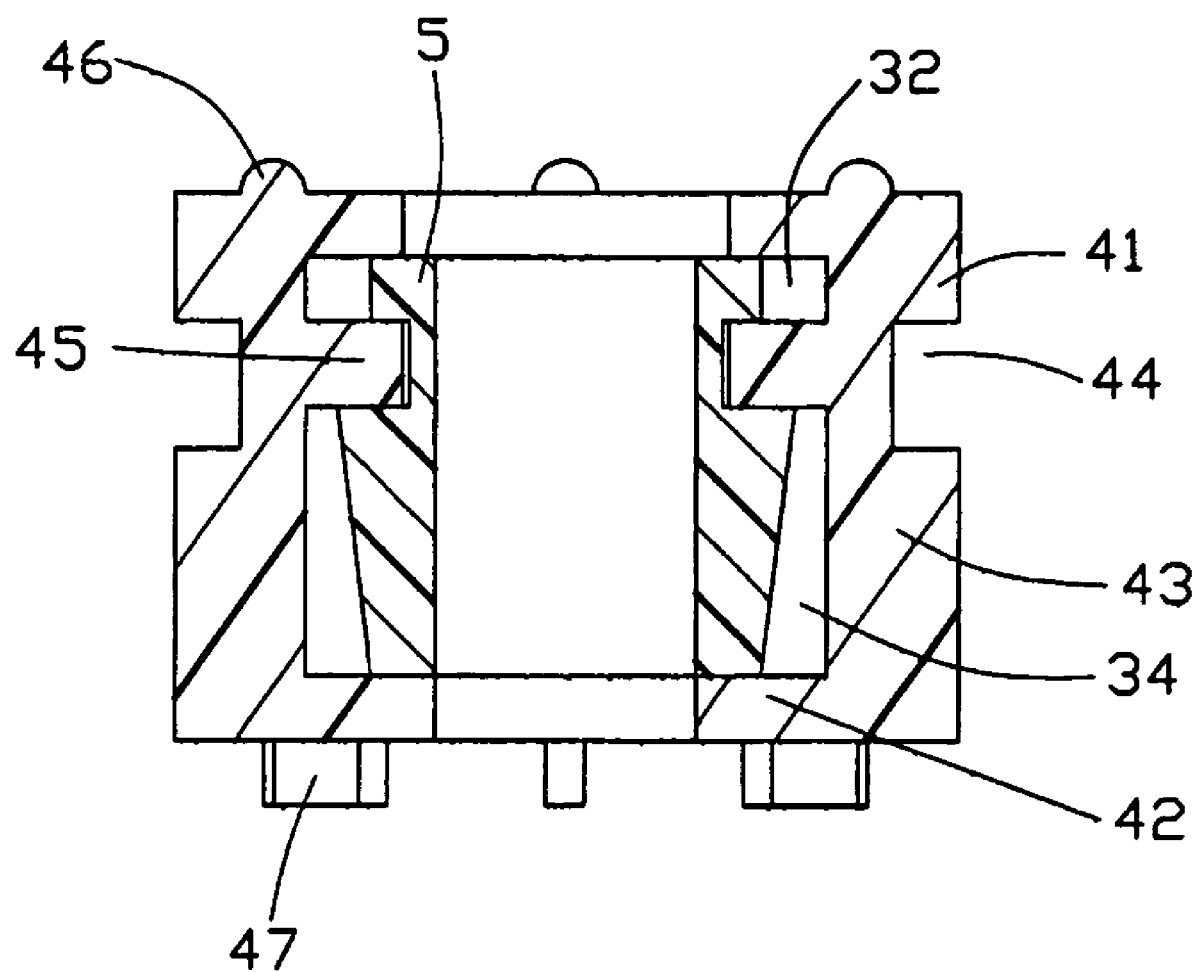
FIG. 4 is a cross-sectional view taken along line IV-IV of FIG. 2.

Referring to FIGS. 2, 3 and 4, each damper unit 30 comprises a first damper 4 and a second damper 5. The first damper 4 is generally cylindrical. An axial first hole 40 is defined through a center of the first damper 4. The first damper 4 further comprises flange-shaped first and second engaging portions 41, 42 located at opposite ends thereof, and a deformable portion 43 located between the first and second engaging portions 41, 42. The deformable portion 43 is formed of a thin material so as to be elastically deformable. A holding recess 44 is defined in a circumferential surface of the deformable portion 43, for engagement of the base member 20 thereat. A flange 45 perpendicularly extends from an interior surface of the deformable portion 43. A plurality of contact protrusions 46, 47 is respectively formed on end surfaces (not labeled) of the first and second engaging portions 41, 42. The contact protrusions 46, 47 are arranged at uniform intervals along an imaginary circle on each of said end surfaces.

The first damper 4 has a damp coefficient adapted to efficiently absorb vibrations generated by unbalanced rotation of the optical disk by the spindle motor 200. The first damper 4 is formed of an elastic material, which can be selected from among various rubbers, soft resins (thermoplastic elastomers), and the like. Therefore, it is possible for the first damper 4 to stretch or contract both in horizontal directions and vertical directions by means of elastic deformation of the deformable portion 43.

Each second damper 5 is also generally cylindrical and formed of an elastic material, and is received in the first hole 40 of the first damper 4. An axial second hole 50 is defined through a center of the second damper 5, for receiving a fastening screw 60 therethrough. The second damper 5 further comprises a pair of opposite end surfaces (not labeled), and a circumferential surface (not labeled). The opposite end surfaces respectively contact interior surfaces (not labeled) of the first and second engaging portions 41, 42 of a corresponding first damper 4. An annular groove 52 is defined in the circumferential surface, for engagingly receiving the flange 45 of the first damper 4. When the second damper 5 is attached inside the first damper 4, two separate spaces 32, 34 are defined between the interior surface of the first damper 4 and the circumferential surface of the second damper 5.

When assembling the optical recording and/or reproducing apparatus 100, the damper units 30 are engaged with the base member 20, with the damper units 30 at the holding recesses 44 engaging in the cutouts of the base member 20. Then, the subassembly of the base member 20 and damper units 30 is mounted onto the frame 10. The damper units 30 are supported on the mounting portions of the frame 10. Four fastening screws 60 are inserted through the first and second holes 40, 50 of the damper units 30 and engaged in the screw holes of the mounting portions, so that the base member 20 is supported on the frame 10 via the damper units 30.

Unlike conventional vibration damping members, the damper unit 30 of the optical recording and/or reproducing apparatus 100 includes the first damper 4 and the second damper 5, with the second damper 5 being received in the first damper 4 thereby defining the spaces 32, 34 between the first and second dampers 4, 5. With this configuration, when the spindle motor 200 rotates at high speed, only the first dampers 4 of the damper units 30 are deformed to absorb corresponding vibration. Because the first dampers 4 have damp coefficients corresponding to this kind of vibration, the vibration is successfully absorbed. In the case where the optical recording and/or reproducing apparatus 100 sustains an impact or shock, such as when it is accidentally bumped or dropped, the vibration produced has a large intensity, and the first damper 4 and the second damper 5 are deformed together. In these circumstances, the damp coefficient of each damper unit 30 equals the damp coefficient of the first damper 4 plus the damp coefficient of the second damper 5. This larger overall damp coefficient of each damper unit 30 enables the damper units 30 to satisfactorily absorb the vibration.

Although the present invention has been described with reference to a specific embodiment, it should be noted that the described embodiment is not necessarily exclusive, and that various changes and modifications may be made to the described embodiment without departing from the scope of the invention as defined by the appended claims.

What is claimed is:

1. A vibration damping means for an optical reproducing/recording apparatus, comprising:
   a first damper with a damp coefficient adapted to absorb vibrations generated when a spindle motor of the apparatus operates, wherein the first damper defines an axial hole, and comprises first and second engaging portions located at opposite ends thereof, and a deformable portion located between the first and second engaging portions; and
   a second damper received in the axial hole of the first damper, wherein opposite ends of the second damper respectively abut the first and second engaging portions of the first damper, and at least one space is defined between the first damper and the second damper.

2. The vibration damping means in accordance with claim 1, wherein the deformable portion is thinner than the first and second engaging portions.

3. The vibration damping means in accordance with claim 1, wherein a flange extends from an interior surface of the deformable portion.

4. The vibration damping means in accordance with claim 3, wherein a periphery of the second damper defines a groove, and the groove engagingly receives the flange of the first damper.

5. The vibration damping means in accordance with claim 1, wherein a periphery of the deformable portion defines a holding recess.

6. The vibration damping means in accordance with claim 1, wherein a plurality of contact protrusions is respectively formed on end surfaces of the first and second engaging portions.

7. The vibration damping means in accordance with claim 1, wherein the second damper defines an axial hole.

8. The vibration damping means in accordance with claim 1, wherein the first damper and the second damper are made of elastic material.

9. An optical recording and/or reproducing apparatus comprising:
   a base member;
   a frame for supporting the base member;
   a spindle motor located on the base member for rotating an optical disk located thereon;
   an optical pickup unit mounted on the base member for transmitting laser beams onto the optical disk and receiving laser beams returned from the optical disk; and
   a vibration damping means connecting the base member with the frame, the vibration damping means including:
   a first damper with a damp coefficient adapted to absorb vibrations generated when the spindle motor rotates, wherein the first damper defines an axial hole, and comprises first and second engaging portions located at opposite ends thereof, and a deformable portion located between the first and second engaging portions; and
   a second damper received in the axial hole of the first damper, wherein opposite ends of the second damper respectively abut the first and second engaging portions of the first damper, and at least one space is defined between the first damper and the second damper.

10. The optical recording and/or reproducing apparatus in accordance with claim 9, wherein a flange extends from an interior surface of the deformable portion, a periphery of the second damper defines a groove, and the groove engagingly receives the flange of the first damper.

11. A vibration damping means for an optical reproducing/recording apparatus having a vibration-sensitive component installed in a frame of said apparatus, comprising:
a first damper installed between said frame and said component, and having damping engagement with said frame and said component respectively, wherein the first damper defines an axial hole, and comprises first and second engaging portions located at opposite ends thereof, and a deformable portion located between the first and second engaging portions, a flange extends from an interior surface of the deformable portion; and
a second damper installed next to said first damper, and having damping engagement with said frame and said first damper respectively, wherein the second damper is received in the axial hole of said first damper, a periphery of the second damper defines a groove, the groove engagingly receives the flange of the first damper, and at least one space is defined between the first damper and the second damper.

12. The vibration damping means in accordance with claim 11, wherein said first damper has a plurality of contact protrusions extending therefrom to have said damping engagement with said frame.

13. The vibration damping means in accordance with claim 11, wherein said first damper is cylindrical.

14. The vibration damping means in accordance with claim 13, wherein said second damper is cylindrical.

15. The vibration damping means in accordance with claim 14, wherein said second damper has an axial second hole to allow a screw passing therethrough and retaining said second damper to said frame.

16. The vibration damping means in accordance with claim 11, wherein opposite ends of the second damper respectively abut the first and second engaging portions of the first damper.

* * * * *